C. D. WOODRUFF,

Assignor to W. H. TUCKER and R. S. DORSEY.

Adjustable Rolling Support for Stoves.

No. 9,283. Reissued July 6, 1880.

WITNESSES.

James B. Liguis.

R. P. Daggett

INVENTOR.

Chauncey D. Woodruff,

PER

C. Bradford,

ATTORNEY.

UNITED STATES PATENT OFFICE.

CHAUNCEY D. WOODRUFF, OF TOLEDO, OHIO, ASSIGNOR TO WILLIAM H. TUCKER AND ROBERT S. DORSEY, OF INDIANAPOLIS, INDIANA.

ADJUSTABLE ROLLING SUPPORT FOR STOVES

SPECIFICATION forming part of Reissued Letters Patent No. 9,283, dated July 6, 1880.

Original No. 123,756, dated February 13, 1872. Application for reissue filed November 1, 1879.

*To all whom it may concern:*

Be it known that I, CHAUNCEY D. WOODRUFF, of the city of Toledo, county of Lucas, and State of Ohio, have invented certain new and useful Improvements in Adjustable Stove-Trucks, of which the following is a specification, reference being had to the accompanying drawings, which are made a part hereof, and on which similar letters of reference indicate similar parts.

Figure 1:
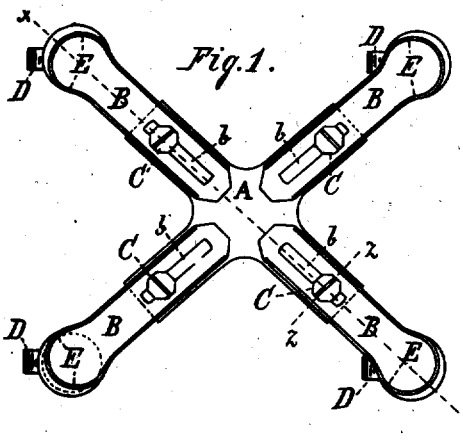
Figure 2:
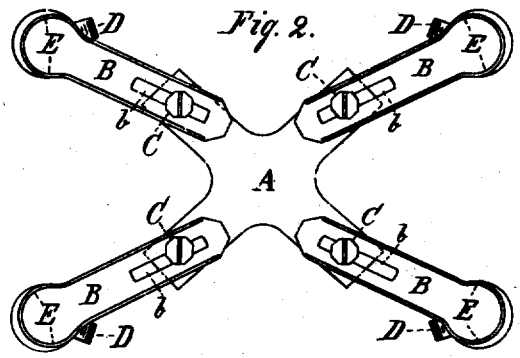
Figure 3:
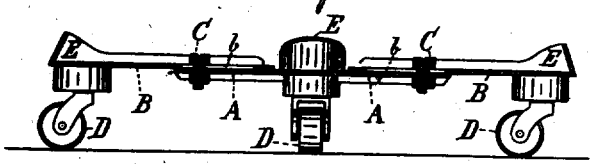
Figure 4:
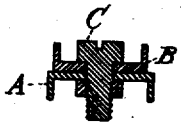
Figure 5:
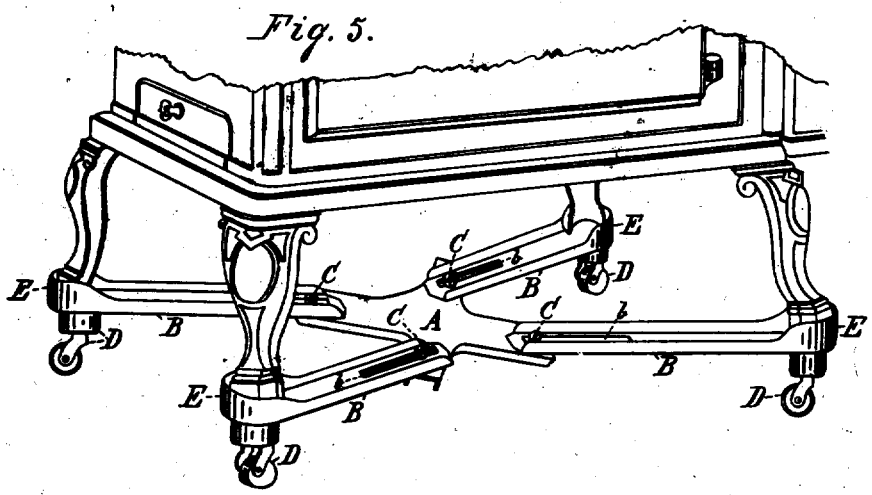

Figure 1 is a top or plan view of my improved truck when in position for use with a stove in which the feet are about equidistant from each other. Fig. 2 is a similar view when the truck is in position for use with a stove in which the feet are farther apart in one direction than the other. Fig. 3 is a vertical central section on the dotted line *x x* in Fig. 1. Fig. 4 is a transverse vertical section of one of the arms, on a larger scale, on the dotted line *z z* in Fig. 1. Fig. 5 is a perspective view of the lower portion of a stove when mounted on my improved truck.

In said drawings the portion marked A represents a central piece which forms a support for the inner end of the arms; B B, arms which are made adjustable by means of longitudinal slots *b*, which pass over bolts C. These arms, when properly connected together and mounted upon suitable casters, as shown, constitute the essential elements of my invention.

Upon the outer end of each of the arms is an upwardly-projecting flange, E, which forms a socket capable of receiving and containing the foot of an ordinary stove-leg, and which prevents the stove from accidentally sliding from its position on the truck when mounted thereon, thus contributing very materially to the usefulness of the device.

The longitudinal slots *b* in the arms B, which allow said arms to slide along the bolts, thus rendering the device adjustable, are the most important feature of my invention, as without them it would be difficult to accomplish the object I have had in view—that of producing a stove-truck consisting of a series of arms the outer ends of which can be brought into any required position to accommodate the location of the feet of an ordinary stove, so that each of said feet shall rest directly upon one of said ends when the stove is placed upon said truck.

The device can be easily and quickly adjusted, as it is only necessary to loosen the bolts and slide the arms inwardly until the flanges on the outer end thereof are near to or in contact with the stove-feet, and retighten the bolts. This simple operation is all that is required to render the truck operative in connection with any stove the feet of which can be inserted within the limits of the expansion and contraction of the arms or truck-beams.

The especial advantages possessed by this device are that it may be easily and quickly adapted to and secured upon the legs of any stove having size within the limit of its adjustment. It is ornamental, and adds to the appearance of the stove. It enables dealers to more easily move stoves from one place to another in a store, or to turn them around for the purpose of exhibition. It is strong and durable, and, being simple in construction, is not liable to get out of order, and can be furnished at a moderate cost.

Having thus fully described my said invention, what I claim as new, and desire to secure by Letters Patent, is—

1. In a stove-truck, a series of radially-adjustable arms, the inner end of each being supported by a suitable connection with the others and the outer end of each by a suitable caster, substantially as specified.

2. A rolling support for stoves, consisting of a frame having a series of adjustable arms, the whole resting upon and supported by casters, substantially as specified.

3. In a stove-truck, a series of arms, B, having longitudinal slots *b* therein, whereby said arms are rendered adjustable on the bolts which pass through said slots, substantially as and for the purpose set forth.

4. In a stove-truck, the combination of a series of arms having longitudinal slots therein, through which the connecting-bolts pass, substantially as specified.

5. The combination of the casters D D, arms B B, bolts C C, and central connecting-piece, A, forming a stove-truck, substantially as specified.

6. A rolling support for stoves, consisting of a frame having a series of radially-adjustable arms provided with suitable sockets for receiving the stove-legs, the whole resting upon and supported by casters, substantially as and for the purpose specified.

7. In a stove-truck, inclosing flanges or sockets for the reception of the stove-feet, substantially as specified.

8. In an adjustable truck, upon the arms or beams thereof the flanges or sockets E, substantially as and for the purpose specified.

In witness whereof I have hereunto set my hand and seal at Toledo, Ohio, this 28th day of June, A. D. 1879.

CHAUNCEY D. WOODRUFF. [L. S.]

In presence of—

G. W. KINNEY,

FRANK E. WRIGHT.